July 18, 1944. O. STEINER 2,353,895
FILM PACK HOLDER OR ADAPTER
Filed Nov. 6, 1941 4 Sheets-Sheet 1
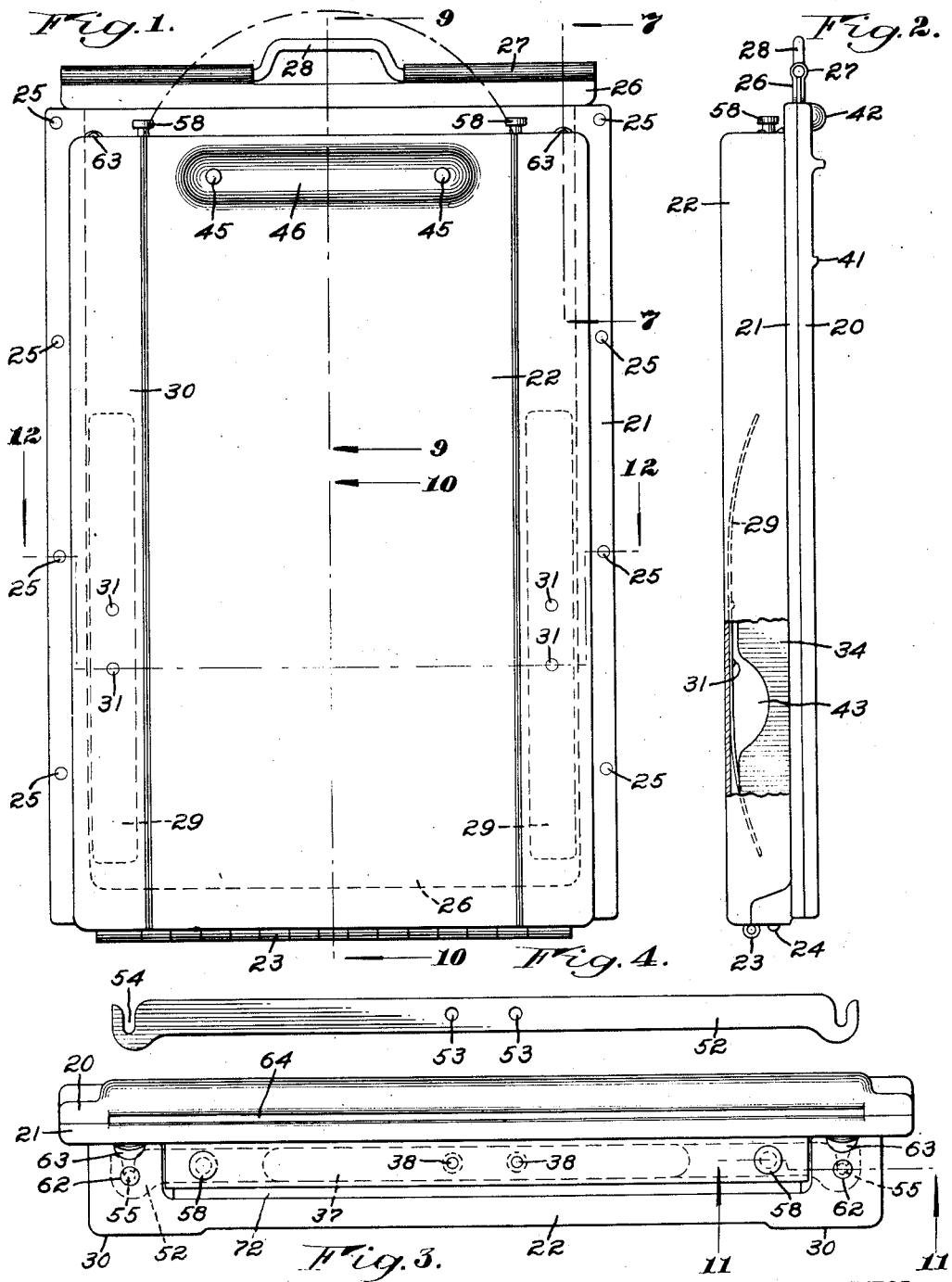
INVENTOR.
Oscar Steiner July 18, 1944.  O. STEINER  2,353,895
FILM PACK HOLDER OR ADAPTER
Filed Nov. 6, 1941  4 Sheets-Sheet 2
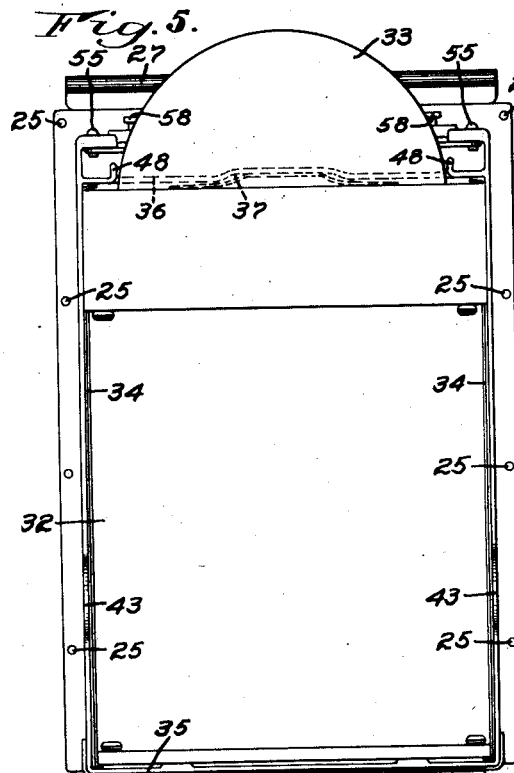
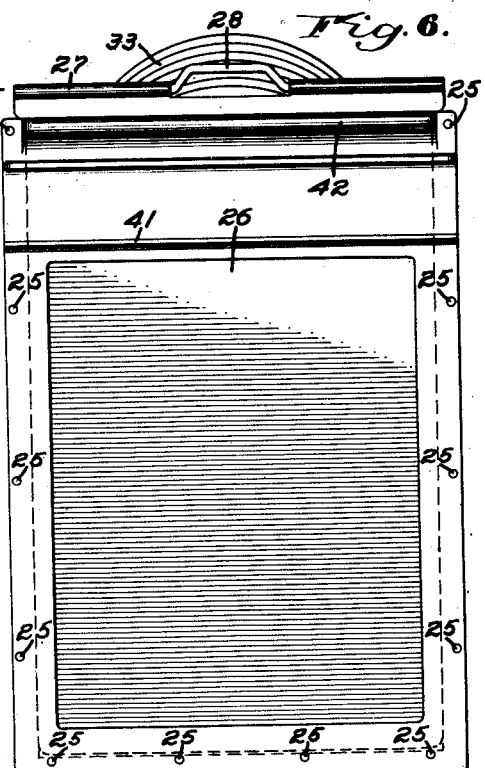
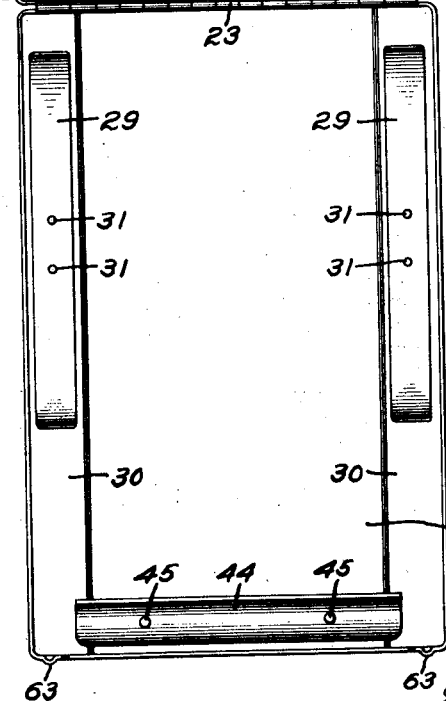
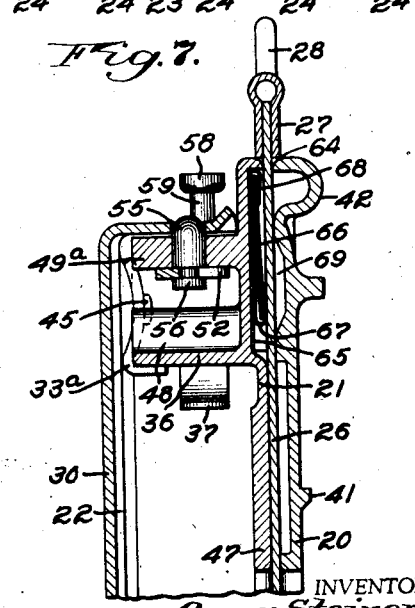
INVENTOR.
Oscar Steiner

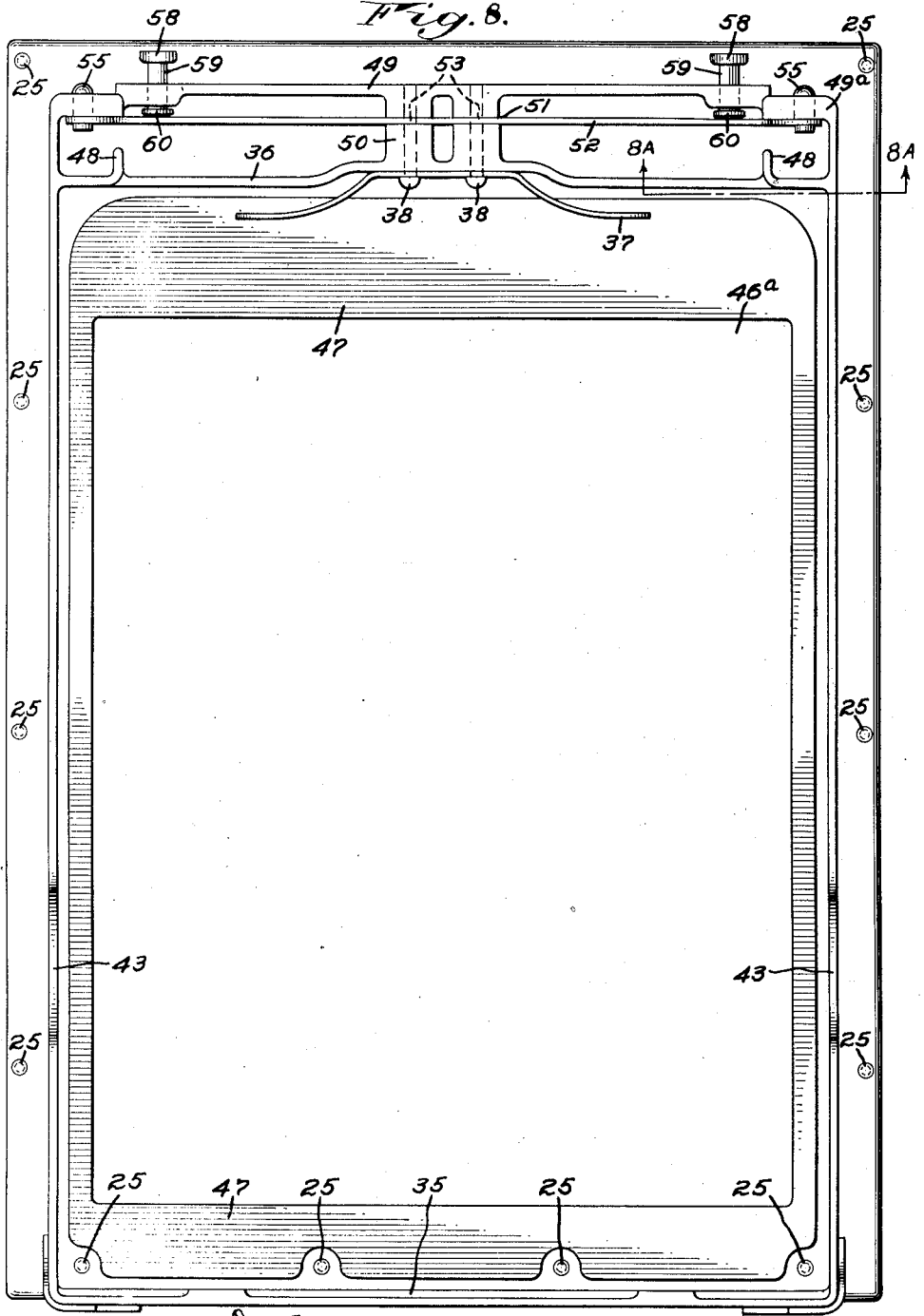

July 18, 1944.  O. STEINER  2,353,895
FILM PACK HOLDER OR ADAPTER
Filed Nov. 6, 1941  4 Sheets-Sheet 4
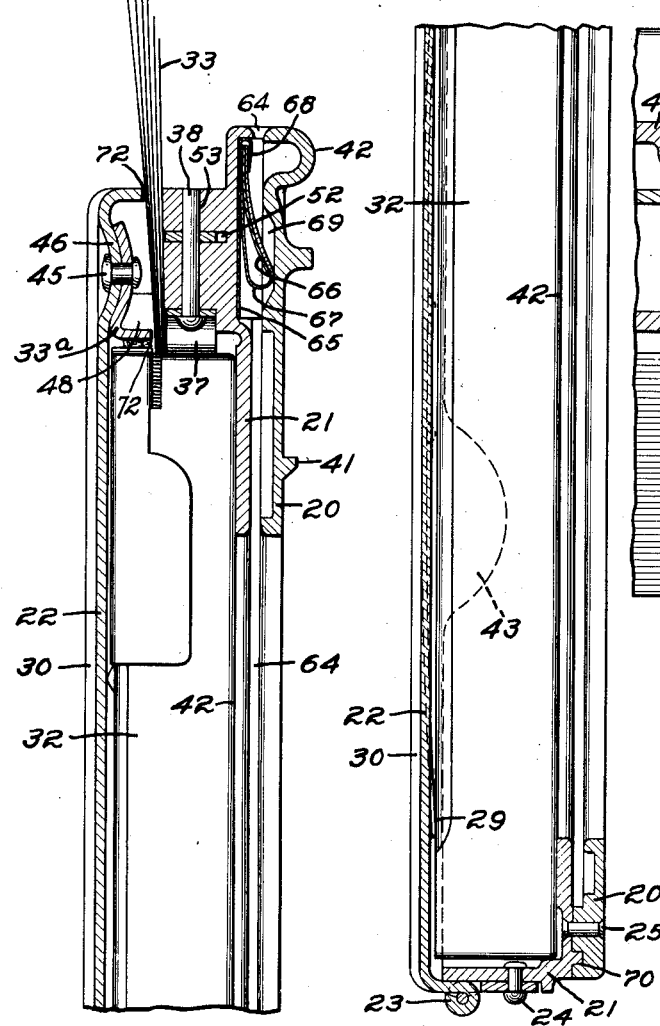
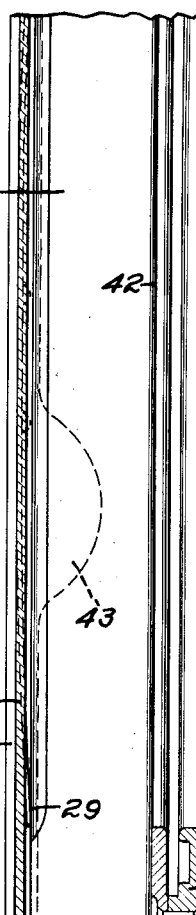
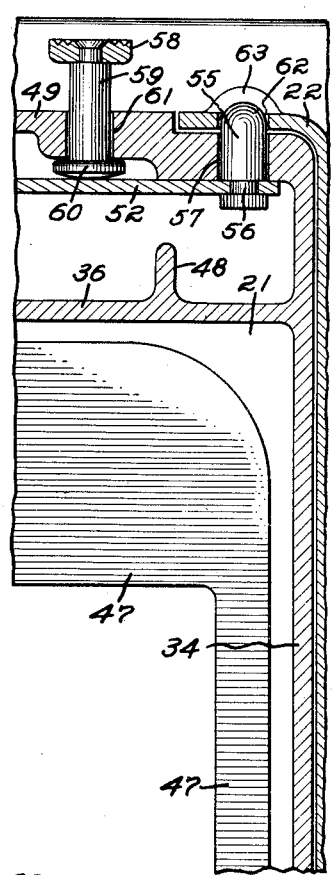
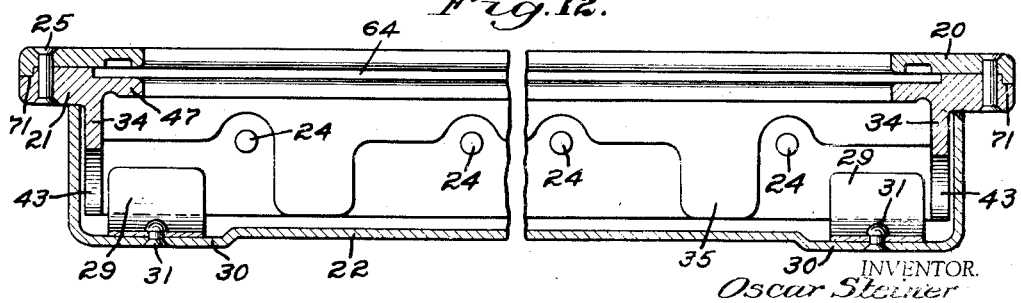
INVENTOR.
Oscar Steiner
BY
his ATTORNEYS Patented July 18, 1944

2,353,895

UNITED STATES PATENT OFFICE 2,353,895

FILM PACK HOLDER OR ADAPTER

Oscar Steiner, Rochester, N. Y., assignor to The Folmer Graflex Corporation, Rochester, N. Y., a corporation of Delaware Application November 6, 1941, Serial No. 418,020

27 Claims. (Cl. 95—66)

This invention relates to film pack holders or adapters.

In order that the principle of the invention may be readily understood, I have disclosed a single embodiment thereof in the accompanying drawings wherein—

Fig. 1 is a vertical elevation showing the film pack holder or adapter in a closed condition;

Fig. 2 is a right hand side elevation of Fig. 1, having a portion of the cover cut away to show the notch in the side member, to assure easy handling of the film pack;

Fig. 3 is a top plan view of Fig. 1 with the dark slide removed;

Fig. 4 is a detail in elevation of the film pack holder cover locking spring;

Fig. 5 is a view similar to Fig. 1, with the film pack holder cover or door open and a film pack in place;

Fig. 6 is a vertical elevation showing the reverse face of the film pack holder from that shown in Fig. 1;

Fig. 7 is an enlarged vertical sectional detail taken on the line 7—7 of Fig. 1;

Fig. 8 is an enlarged elevation of the film pack holder, viewing from the cover side, the cover, film pack and dark slide being removed;

Fig. 8a is a partial transverse section taken through the film pack holder near its upper end on the line 8a—8a and looking toward the upper end of the said holder in Fig. 8;

Fig. 9 is a partial vertical section of Fig. 1 taken on the line 9—9 thereof;

Fig. 10 is a partial cross section of Fig. 1 taken on the line 10—10 thereof;

Fig. 11 is an enlarged fragmentary detail, partially in section, of the structure shown in Fig. 8; and Fig. 12 is a horizontal cross section of Fig. 1 taken on the line 12—12 thereof.

The film pack holder or adapter herein disclosed is a new structure having a great number of features constituting improvements over existing holders. In recent years sensitized material has been greatly improved in respect to emulsion speed. Also, it has become common practice to use lenses of much larger aperture. These changes have a direct bearing on film pack holders, since, if the emulsion speed is much faster, additional guards against light leak are necessary. Because of the wider aperture lenses, with consequent less depth of focus, the accuracy of the focal plane must be very much closer than heretofore. The film pack must be securely held in position to insure the accuracy of the focal plane. A common fault found when using film packs is light leak caused by improper handling of the film tabs. By my invention I have provided means to prevent light leaks caused by the improper handling of the film tabs.

One object of the invention is to provide a film pack holder that will securely position and hold the film pack in proper position. Other objects of the invention are—to provide a film pack holder that can readily be loaded and unloaded in such manner that the film pack will be in correct position without the necessity of observing undue caution; to provide a film pack holder of simple metal construction having a minimum number of parts, that when assembled provides a rigid light-tight and precision structure; to provide a film pack holder that can readily be placed in the camera and removed therefrom without inadvertently causing light leak by finger pressure on the film pack tabs; and to provide a film pack holder having a structure that protects and holds in position the film pack tabs at all times, thus preventing light leak when the tabs are being torn.

Referring first to Figs. 1 to 6, there is shown therein the film pack holder or adapter, hereinafter referred to as a film pack holder, and which is constructed in accordance with my invention. The said film pack holder has a front frame or member 20, a back frame or member 21 which are, in this embodiment of the invention, secured together and together constitute a body receiving the film pack, and a cover or door 22 hinged to the said back frame by a hinge 23 held thereto by rivets 24, 24 shown on a larger scale in Figs. 10 and 12. Said front and back frames are held together by rivets 25, 25. The holder is provided with the usual dark slide 26 having a handle 27 provided with a bail 28. Opposite pressure springs 29, 29 are provided. To provide space for them and as means acting as slide rails, the cover 22 is provided with opposite raised formations 30, 30 on either side of the holder cover. Each spring 29 is securely riveted to the cover by rivets 31, 31.

In Fig. 5, the film pack holder is shown with the cover or door 22 opened, and a film pack 32 having film tabs 33 is shown in position. Said back frame 21 is provided with box-like side members 34, 34, shown in section in Fig. 12, a bottom box member 35, shown in section in Fig. 10, and a top box member 36, most clearly shown in Fig. 8; and, as therein shown, to said upper box member 36 is attached a film pack hold-down spring 37, rivets 38, 38 being provided for this purpose. The said four members 34, 34, 35, 36 are termed box-like members as the four of them resemble in function the four walls of a box and receive the film pack between them. Each of said four members is a wall that receives against it one edge of the film pack. The front frame 20 is provided with an opening through which appears the dark slide 26. Said front frame 21 is provided with the usual light lock rail 41 of any usual or desired construction, and with a film pack holder handle 42. The said box-like side members 34, 34 are provided with notches 43, 43, best shown in Figs. 2, 5 and 8, which are for the purpose of permitting easy removal of the film pack from the holder.

A film tab retaining strip 33a is attached to the holder cover 22 by means of rivets 45, 45, best shown in Figs. 7 and 9, and is a rigid, thin, transverse ledge extending inward from the cover or door to a point close to the positioned tabs of the film pack to retain the film tabs at that point against backward pull on the tabs at their upper ends. The said retaining strip 33a is so shaped as accurately to fit a depression 46 in the holder cover 22, which, as best appears in Fig. 1 and in section in Fig. 9, is of an elongated construction concaved in cross section. The purpose of such structure will be set forth more fully at a subsequent part of the description. The said depression 46 serves also as a handle-means for facilitating removal of the film pack holder from the camera back.

Referring to Fig. 8, wherein the structure is shown on a greatly enlarged scale and is viewed from the back or covered side thereof, the cover and the back slide have been removed, and the back frame 21 appears in elevation, it being provided with an opening 46a corresponding in dimensions to the said opening in the front holder frame 20 and in alignment therewith. Surrounding the said opening 46a and forming a ledge for the reception of the film pack is a raised, elongated formation, indicated at 47, 47, the purpose thereof being to provide an accurate skeleton or open face surface for the location of the film pack.

Upwardly extending from the top box member 36 are formations 48, 48, shown in section in Fig. 11 and in elevation in Figs. 5 and 8, for guiding the film tabs 33, and the space between the said formations 48, 48 is occupied by said film tabs when the film pack 32 is in place.

That portion of the upper box member 36 that is located between the said formations 48, 48 is of a lesser height in a direction normal to Fig. 5 than is the portion beyond the said formations as clearly shown in Fig. 8a, such construction being for the purpose of providing space for the film tabs when the film pack holder is in place.

Above the top box member 36 is a transversely extending member 49, shown in section in Fig. 11, forming the upper wall of the holder, and at the junction of the transversely extending member 49 and the side box members 34 are thickened portions or sections 49a, 49a, best shown in section in Figs. 7 and 11 to receive latch pawls to be described. Between the parts of said sections 49a, 49a, as best indicated in Fig. 8, the said transversely extending member 49 is of less height, so as to provide space for the film pack 32. Between the transversely extending member 49 and the box-like member 36 is a boss 50, shown in section in Fig. 9, having a slot 51 receiving a cover latch spring 52. The pins 38, 38 pass through holes 53, 53 provided in the spring 52, as shown most clearly in Figs. 8 and 9. The outer ends of said spring 52, as shown best in Fig. 4, are provided with formations 54, 54 to engage cover latch pawls 55, 55, most clearly shown in Fig. 7 as received in the thickened parts 49a, 49a, the construction being for the purpose of providing ready means of assembling the parts. The said latch pawls 55, 55 are provided with circumferential grooves 56 engaged by the hook formations 54, 54.

In assembling the parts, the latch pawls 55, 55 are placed in the holes 57, as indicated in Fig. 11, the latch spring 52 is then placed in the slot 51, the spring 37 is placed against the boss 50, and the pins 38, 38 are then forced or driven through the holes in the spring 37 into the holes in the boss 50 and through the holes 53, 53 of the latch spring 52. In this manner the spring 37, the latch spring 52 and the latch pawls 55 are held in place, as clearly indicated in Figs. 8 and 9.

In order to operate the latch pawls 55, 55, as shown in Fig. 11, there are provided buttons 58, 58 attached to plungers 59, 59 each provided with a head 60. Each plunger 59 passes through a hole 61 in the transversely extending member 49. The back cover 22 is provided with holes 62, 62 for engaging the latch pawls 55 when the cover is closed. Downward pressure on the buttons 58, 58 will cause the spring 52 to bend downwardly, carrying with it said latch pawls 55, 55, so as to disengage them from the holes 62, 62 of the cover or door 22 and permitting the latter to be opened for either removing or replacing the film pack 32. The said cover or door 22 is provided with lips 63, 63, indicated in Fig. 11, for engaging and forcing downward the latch pawls 55, 55 when the cover or door is closed.

In Figs. 9 and 10, wherein the film pack 32 is shown in place, there is indicated a space 64 between the front frame 20 and the back frame 21 for the reception of the dark slide 26. In the upper end of said back frame 21, as best shown in Fig. 7, is provided a cavity receiving a light valve consisting of a base member 65, a spring member 66 and a fabric cover 67, both held to the base member 65 by the folded over end 68, this construction being desirably that shown in the patent to Charles Roth, No. 2,056,144, dated September 29, 1936.

The said front frame 20, as shown in Fig. 7, is provided with a cavity 69 receiving the outer end of the said light valve when the dark slide 26 is removed, and when said slide is in place, the said light valve is compressed thereagainst, as clearly indicated in Fig. 7, thus excluding all light from the sensitized surface. The top box member 36, the upwardly extending formations 48, 48 and the retaining strip 33a provide a restricted path for the film tabs 33. Inasmuch as the cover or door 22 extends upward a substantial distance beyond the film pack 32, as indicated in Fig. 9, it is impossible to pull a film tab 33 in a backward direction at the film pack openings, and therefore it is impossible there to separate the tabs and allow light to reach the sensitized film area. The upper inwardly extending edge of the cover or door 22 also affords an edge against which the film tabs 33 may be torn off after a new film surface has been positioned.

The film tab retaining strip 33a is so positioned that it narrows down the opening between the top box member 36 and the bent-over end of such retaining strip. Between the transversely extending member 49 and the cover or door 22 is formed a slot-like opening 72 for the passage of the said film pack tabs 33.

In the usual film pack holder, so far as I am aware, there is no provision for supporting the film tabs as they are torn off after a new sensitized film is in place, and this has heretofore permitted light leaks when using film packs. In accordance with my invention, however, the film pack tabs 33 are supported a substantial distance above the opening in the film pack, and inasmuch as the opening 72 is a rather narrow slot, the pulling-back action for the purpose of tearing off a film tab does not cause the film tabs to be separated at the film pack.

As is clearly evident from Figs. 10 and 12, there is provided a light lock indicated at 70 on the bottom edge of the film pack holder, and a light lock 71, 71 is provided on each side of the film pack holder and extending inwardly across the top thereof until the opening for the dark slide 26 is reached. This construction prevents any light leaking in between the upper and lower members or parts of the film pack holders.

The film pack holder herein disclosed corrects the defects and faults of existing film pack holders or adapters so far as I am aware. Moreover the structure is one that possesses the advantages of modern manufacturing methods with the result that an all-metal film pack holder or adapter is provided with a minimum number of parts requiring only a very small amount of machining. This permits the manufacture of a high-grade, precision, all-metal, film-pack adapter at a cost very slightly in excess of the usual wooden adapters heretofore employed.

Having thus described one embodiment of the invention, it is to be understood that although specific terms are employed, they are used in a generic and descriptive sense and not for purposes of limitation, the scope of the invention being set forth in the following claims.

I claim:

1. A film pack holder or adapter having a thin, substantially flat, front frame or member and a back frame or member, said two frames or members being structurally distinct, and means at substantially their extreme lateral edges to secure them together in face-to-face relation, said two frames or members being sufficiently spaced by a peripheral formation on one of said members, formed adjacent each of the side walls thereof and the bottom wall thereof, to receive a dark slide between them, said back frame or member having parallel, transversely extending, relatively high, top and bottom walls and parallel, longitudinally extending, relatively high, side walls, all projecting upwardly substantially normal to said front frame or member to a sufficient extent to receive a usual film pack having projecting tabs, thereby providing a relatively deep chamber to receive such film pack, said top wall having pack-holding-down spring means, said back frame or member at its longitudinally-extending lateral edges extending substantially beyond said side walls so as to provide substance for the reception of the said securing means by which said two frames or members are secured in such face-to-face relation, and a cover hinged at its lower end to the upstanding bottom wall of said back frame or member at the back of the latter to overlie said film pack, and having lateral, inwardly extending, relatively deep flanges to enclose said side walls, and having at its upper end formations to engage latching means upon said transversely extending top wall of the back frame or member the said cover at its upper end and the adjacent part of the back frame or member being shaped to afford a tab exit.

2. A film pack holder or adapter having a thin, substantially flat, front frame or member and a back frame or member, said two frames or members being structurally distinct, but secured together in face-to-face relation, being sufficiently spaced to receive a dark slide between them, said back frame or member having parallel, transversely extending, top and bottom walls and parallel, longitudinally extending, side walls, all projecting upwardly substantially normal to said front frame or member, thereby providing a chamber to receive a film pack, and a cover hinged at its lower end to said back frame or member at the back of the latter to overlie said film pack, the said projecting top wall of the back frame or member having a hold-down spring attached thereto, to engage the upper end of the film pack when in position.

3. A film pack holder or adapter comprising a body member to receive the film pack and a cover or door hinged at the bottom of the body member to enclose the film pack when shut, and having a top edge constituting a tearing edge for the film tabs and also having a film-tab retaining strip at the inner face of said cover or door below and markedly spaced from said tearing edge and positioned so that the inner edge of said film-tab retaining strip permits only a restricted path to be presented for the film tabs.

4. A film pack holder or adapter having a thin, substantially flat, front frame or member and a back frame or member, said two frames or members being structurally distinct, but secured together in face-to-face relation, being sufficiently spaced to receive a dark slide between them, said back frame or member having parallel, transversely extending, top and bottom walls and parallel, longitudinally extending, side walls, all projecting upwardly substantially normal to said front frame or member, thereby providing a chamber to receive a film pack, and a cover hinged at its lower end to said back frame or member at the back of the latter to overlie said film pack, the said cover having its upper end extending inwardly sufficiently close to the upper end of the back frame or member to afford an edge against which the film tabs may be torn off, the said cover, markedly below the upper edge thereof, having secured thereto a transversely and inwardly extending film-tab retaining strip positioned so that only a restricted path is presented for the film tab between its inner edge and the back frame or member, whereby the pulling-back action for the purpose of tearing off a film tab does not cause the film tabs to be separated at the film pack.

5. A film pack holder or adapter according to claim 3, but wherein the cover or door is provided with a transversely extending depression 43, the said film-tab retaining strip being a structurally separate piece secured against the inner face of said depression, said depression serving as a handle means for removing the film holder from the camera.

6. A film pack holder or adapter in accordance with claim 1, but having at the top of the back frame or member a box member 36 against the lower face of which the upper edge of the film pack is received, film-pack hold-down spring means secured to the lower face of said top box member to engage the upper edge of the film pack, said top box member 36 having formations 48, 48 extending upward therefrom and spaced apart by substantially only the basal width of the tabs of the film pack so as to guide said tabs.

7. A film pack holder or adapter in accordance with claim 1, but having the back frame or member thereof provided with a top box member 36 against which the top edge of the film pack is received, the said top box member 36 being provided with formations 48, 48 integral with and extending upwardly from said box member and spaced apart by substantially only the basal width of the tabs of the film pack for guiding said film pack tabs, the portion of the said top box member 36 between said formations 48, 48 being of less height in the direction of the thickness of the pack holder than is the height in said direction of the portions of said member 36 laterally beyond said formations 48, 48.

8. A film pack holder or adapter in accordance with claim 1, the back frame or member having a top box member 36 against which the upper edge of the film pack is received, there being a transversely extending member 49 above, parallel with and spaced from said top box member 36 and constituting the upper, transversely extending wall of the film pack holder or adapter.

9. A film pack holder or adapter having front and back frames or members together constituting a body to receive the film pack, and a cover or door hinged to the back frame or member to enclose the film pack, the latter member having a top box member 36 substantially against which the upper edge of the film pack may be received, and a transversely extending member 49 above, parallel with and spaced from said member 36, and constituting the upper transversely extending wall of the holder or adapter, said member 49 having thickened side parts 49a, 49a, and latch pawls received in said thickened side parts.

10. A film pack holder or adapter having front and back frames or members together constituting a body to receive the film pack, and a cover or door hinged to the back frame or member to enclose the film pack, the latter member having a top box member 36 substantially against which the upper edge of the film pack may be received, and a transversely extending member 49 above, parallel with and spaced from said member 36, and constituting the upper transversely extending wall of the holder or adapter, said member 49 having thickened side parts 49a, 49a, and cover or door securing means and releasing means mounted in said thickened parts.

11. A film pack holder or adapter having front and back frames or members together constituting a body to receive the film pack, and a cover or door hinged to the back frame or member to enclose the film pack, the latter member having a top box member 36 substantially against which the upper edge of the film pack may be received and a transversely extending member 49 above, parallel with and spaced from member 36, and a boss 50 between said members and a cover latch spring 52 attached to said boss.

12. A film pack holder or adapter having front and back frames or members together constituting a body to receive the film pack, and a cover or door hinged to the back frame or member to enclose the film pack, the latter member having a top box member 36 substantially against which the upper edge of the film pack may be received and a transversely extending member 49 above, parallel with and spaced from member 36 and a boss 50 between said members substantially mid-length thereof, said boss having a slot 51 and a cover latch spring 52 secured to said slot.

13. A film pack holder or adapter having front and back frames or members together constituting a body to receive the film pack, and a cover or door hinged to the back frame or member to enclose the film pack, the latter member having a top box member 36 substantially against which the upper edge of the film pack may be received and a transversely extending member 49 above, parallel with and spaced from member 36, and a boss 50 between said members and a cover latch spring 52 attached to said boss, said spring 52 having two ends provided with formations 54 to engage cover latch pawl means.

14. A film pack holder or adapter having front and back frames or members together constituting a body to receive the film pack, and a cover or door hinged to the back frame or member to enclose the film pack, the latter member having a top box member 36 substantially against which the upper edge of the film pack may be received and a transversely extending member 49 above, parallel with and spaced from member 36, and a boss 50 between said members and a cover latch spring 52 attached to said boss, said spring 52 having two ends provided with hook-like formations 54, 54, and movable cover latch pawls 55, 55.

15. A film pack holder or adapter having front and back frames or members together constituting a body to receive the film pack, and a cover or door hinged to the back frame or member to enclose the film pack, the latter member having a top box member 36 substantially against which the upper edge of the film pack may be received and a transversely extending member 49 above, parallel with and spaced from member 36, and a boss 50 between said members and a cover latch spring 52 attached to said boss, said spring 52 having two ends provided with hook-like formations 54, 54, and movable cover latch pawls 55, 55, said pawls having circumferentially extending grooves 56, 56 for the reception of said formations 54, 54 of said spring 52.

16. A film pack holder or adapter having front and back frames or members together constituting a body to receive the film pack, and a cover or door hinged to the back frame or member to encolse the film pack, the latter member having a top box member 36 substantially against which the upper edge of the film pack may be received and a transversely extending member 49 above, parallel with and spaced from member 36, and a cover latch spring 52 attached to said member 49, and plunger-means carried by the said member 49 and adapted to engage said spring 52.

17. A film pack holder or adapter having front and back frames or members together constituting a body to receive the film pack, and a cover or door hinged to the back frame or member to enclose the film pack, the latter member having a top box member 36 substantially against which the upper edge of the film pack may be received and a transversely extending member 49 above, parallel with and spaced from member 36, and a boss 50 between said members, and a cover latch spring 52 having holes 53, 53 therein, and securing means extending through said holes for securing said spring to said boss.

18. A film pack holder or adapter having front and back frames or members together constituting a body to receive the film pack, and a cover or door hinged to the back frame or member to enclose the film pack, the latter member having a top box member 36 substantially against which the upper edge of the film pack may be received and a transversely extending member 49 above, parallel with and spaced from member 36, and a cover latch spring 52 attached to said member 49, and plunger means carried by the said member 49 and adapted to engage said spring 52, said plunger means including plungers 59 having heads 60 to engage said spring and having buttons 58 exposed for manual application of pressure.

19. A film pack holder or adapter having front and back frames or members together constituting a body to receive the film pack, and a cover or door hinged to the back frame or member to enclose the film pack, the latter member having a top box member 36 substantially against which the upper edge of the film pack may be received and a transversely extending member 49 above, parallel with and spaced from said member 36 and constituting the upper transversely extending wall of the holder or adapter, and cover latch pawl means carried by said member 49, the said cover or door having formations to receive said latch pawl means.

20. A film pack holder or adapter having front and back frames or members together constituting a body to receive the film pack, and a cover or door hinged to the back frame or member to enclose the film pack, the latter member having a top box member 36 substantially against which the upper edge of the film pack may be received and a transversely extending member 49 above, parallel with and spaced from said member 36 and constituting the upper transversely extending wall of the holder or adapter, and cover latch pawl means carried by said member 49, the said cover or door having holes 62, 62 to receive the said pawl means.

21. A film pack holder or adapter having front and back frames or members together constituting a body to receive the film pack, and a cover or door hinged to the back frame or member to enclose the film pack, the latter member having a top box member 36 substantially against which the upper edge of the film pack may be received and a transversely extending member 49 above, parallel with and spaced from said member 36 and constituting the upper transversely extending wall of the holder or adapter, and cover latch pawl means carried by said member 49, the said cover or door having formations to receive said latch pawl means, and plungers 59, 59 mounted for sliding movement in said member 49.

22. A film pack holder or adapter having front and back frames or members together constituting a body to receive the film pack, and a cover or door hinged to the back frame or member to enclose the film pack, the latter member having a top box member 36 substantially against which the upper edge of the film pack may be received and a transversely extending member 49 above, parallel with and spaced from said member 36 and constituting the upper transversely extending wall of the holder or adapter, and cover latch pawl means carried by said member 49, the said cover or door having formations to receive said latch pawl means, and plungers 59, 59 mounted for sliding movement in said member 49, and a spring 52 supported at substantially mid-length between said members 36 and 49 and itself having formations to engage said pawl means for moving the same to permit opening of the said cover or door.

23. A film pack holder or adapter having front and back frames or members together constituting a body to receive the film pack and a cover or door hinged to the back frame or member to enclose the film pack, the latter member having a top box member 36 substantially against which the upper edge of the film pack may be received, said member 36 being provided with formations 48, 48 extending upwardly therefrom and spaced apart the basal width of the tabs of the film pack for guiding the said film pack tabs, the said cover or door having a film tab retaining strip 33a, constituting a rigid, thin, transverse ledge extending inward from said cover or door to a point close to the positioned tabs of the film pack to retain the film tabs at that point against backward pull on the tabs at their upper ends, said strip 33a being markedly below and spaced from the upper edge of the said cover or door, said cover or door having its extreme upper edge extending inward to provide an edge against which the film tabs may be torn off.

24. A film pack holder or adapter having front and back frames or members together constituting a body to receive the film pack and a cover or door hinged to the back frame or member to enclose the film pack, the latter member having a top box member 36 substantially against which the upper edge of the film pack may be received, said member 36 being provided with formations 48, 48 extending upwardly therefrom and spaced apart the basal width of the tabs of the film pack for guiding the said film pack tabs, the said cover or door extending above the film pack when in position, and having a film tab retaining strip 33a, below and markedly spaced from the upper edge of the cover or door and extending close to the outermost film tab, at substantially the top of the film pack, the top of the said cover or door providing an edge against which the film tabs may be torn off.

25. A film pack holder or adapter having front and back frames or members together constituting a body to receive the film pack and a cover or door hinged to the back frame or member to enclose the film pack, the latter member having a top box member 36 substantially against which the upper edge of the film pack may be received, said member 36 being provided with formations 48, 48 extending upwardly therefrom and spaced apart the basal width of the tabs of the film pack for guiding the said film pack tabs, and means below the top edge of the cover or door for supporting the film tabs as they are being torn off, said means consisting of a rigid, thin, transverse ledge extending inward from said cover or door to a point close to the positioned tabs of the film pack to retain the film tabs at that point against backward pull on the tabs at their upper ends, and positioned markedly below and spaced from the upper edge of said cover or door against which upper edge the film tabs may be torn off.

26. A film pack holder or adapter having front and back frames or members together constituting a body to receive the film pack and a cover or door hinged to the back frame or member to enclose the film pack, the latter member having a top box member 36 substantially against which the upper edge of the film pack may be received, said member 36 being provided with formations 48, 48 extending upwardly therefrom and spaced apart the basal width of the tabs of the film pack for guiding the said film pack tabs, the said cover or door having a film tab retaining strip 33a secured thereto below and markedly spaced from the upper edge of the cover or door and extending close to the outermost film tab, at substantially the top of the film pack, the said construction providing a restricted, slot-like path for the film tabs.

27. A film pack holder or adapter having front and back frames or members together constituting a body to receive the film pack and a cover or door hinged to the back frame or member to enclose the film pack, the latter member having a top box member 36 substantially against which the upper edge of the film pack may be received, said member 36 being provided with formations 48, 48 extending upwardly therefrom and spaced apart the basal width of the tabs of the film pack for guiding the said film pack tabs, the said cover or door having a film tab retaining strip 33a secured thereto below and markedly spaced from the upper edge of the cover or door and extending close to the outermost film tab, at substantially the top of the film pack, the said construction providing a restricted, slot-like path for the film tabs, the top of the cover or door extending above the film pack and providing an edge against which the said tabs may be torn off.

OSCAR STEINER.